United States Patent
Reichenbach et al.

(10) Patent No.: US 7,346,213 B2
(45) Date of Patent: Mar. 18, 2008

(54) METHOD FOR OPTICALLY RECOGNIZING ALPHA-NUMERICAL CHARACTERS

(75) Inventors: Juergen Reichenbach, Emmendingen (DE); Achim Nuebling, Emmendingen (DE); Thomas Schopp, Freiburg (DE)

(73) Assignee: Sick AG, Waldkirch (DE)

( * ) Notice: Subject to any disclaimer, the term of this patent is extended or adjusted under 35 U.S.C. 154(b) by 806 days.

(21) Appl. No.: 10/917,887

(22) Filed: Aug. 13, 2004

(65) Prior Publication Data
US 2005/0041870 A1 Feb. 24, 2005

(30) Foreign Application Priority Data
Aug. 18, 2003 (DE) .............................. 103 37 831

(51) Int. Cl.
*G06K 9/18* (2006.01)
(52) U.S. Cl. ...................... 382/182; 382/199; 382/197
(58) Field of Classification Search ................ 382/182, 382/199, 197
See application file for complete search history.

(56) References Cited

U.S. PATENT DOCUMENTS

| 4,783,829 A | | 11/1988 | Miyakawa et al. |
| 5,048,099 A | | 9/1991 | Lee |
| 5,054,098 A | * | 10/1991 | Lee ............................ 382/289 |
| 5,841,905 A | * | 11/1998 | Lee ............................ 382/203 |

FOREIGN PATENT DOCUMENTS

| DE | 3825582 A1 | 7/1988 |
| DE | 19531392 C1 | 8/1995 |

| EP | 0604687 A1 | 7/1994 |

OTHER PUBLICATIONS

Kaup, Andre et al.; "Polygonal shape descriptors—an efficient solution for image retrieval and object localization"; 2000, *Conference Record of the Thirty-Fourth Asilomar Conference on Signals, Systems and Computers*, pp. 59-64.

(Continued)

*Primary Examiner*—Matthew C. Bella
*Assistant Examiner*—Mike Rahmjoo
(74) *Attorney, Agent, or Firm*—Townsend and Townsend and Crew LLP

(57) ABSTRACT

A method for optically recognizing alphanumeric characters which involves storing polygonal outer contours and inner contours of reference characters and their relative geometrical positions as normalized reference curves transformed into a tangent space. Outer and inner contours of a character to be recognized are optically scanned and the scanned data is converted into binary data. The outer and inner contours of the character to be recognized are approximated as a polygon, and straight line segments of the polygon are normalized and transformed into a tangent space to generate character curves. The character to be recognized is compared to the reference characters in a rotation-invariant manner by shifting at least its character curve for the outer curve and the reference curves of the outer contours relative to each other in the tangent space until a surface area enclosed by the character curve and a given reference curve is at a minimum. The surface area between the character curves for the outer contour and the inner contours of the character to be recognized and respective reference curves for outer contours and the inner contours of the reference characters are used as a measure of the extent to which the character and the reference characters differ. The reference character which yields the smallest surface area between the character curves and the reference curves is then selected as the recognized character.

5 Claims, 3 Drawing Sheets

OTHER PUBLICATIONS

Latecki, Longin J.. et al.; "Shape Similarity Measure based on Correspondence of Visual Parts"; 2000, *IEEE Transactions on Pattern Analysis and Machine Intelligence*, vol. 22, No. 10, pp. 1185-1190.

* cited by examiner

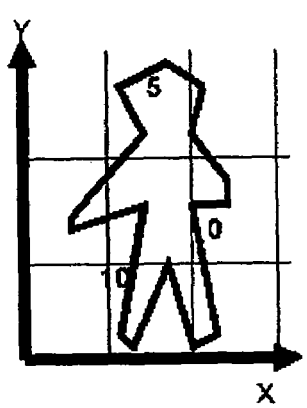
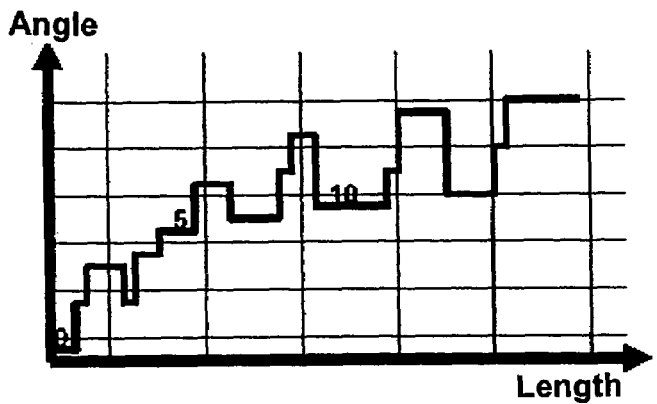
Fig. 1a                        Fig. 1b
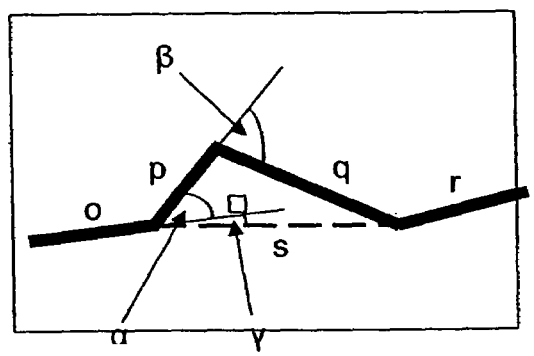
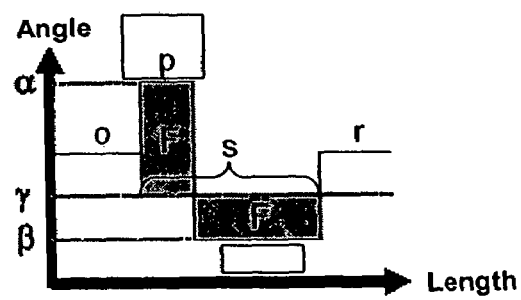
Fig. 2a                        Fig. 2b

METHOD FOR OPTICALLY RECOGNIZING ALPHA-NUMERICAL CHARACTERS

BACKGROUND OF THE INVENTION

The invention concerns a method for the optical recognition of alphanumeric characters.

The optical recognition of alphanumeric characters, usually termed optical character recognition (OCR), is used to automatically convert written, printed or, if desired, even handwritten texts into a data form that can be electronically processed. The characters being recognized are optically scanned and binarized to create a file that can be analyzed with suitable software and transformed into a computer-compatible data record.

Various techniques are known for using so-called OCR characters, particularly standardized characters, to facilitate a comparison with reference characters stored in a memory.

In so-called pattern matching, a character pattern detected by optical scanning is compared against stored reference characters by pattern overlay for determining the best possible match. This method is problematical when different fonts, character sizes and/or degrees of character definition need to be recognized.

In the so-called feature recognition technique, the characters are assigned certain characteristic features, such as vertical and horizontal strokes, crossing points and curves. The characters to be recognized are examined with regard to such features and compared against pattern forms stored in memory. This technique is less dependent on type of font and/or size and is therefore more reliable.

In so-called angular section analysis, the character or mark to be recognized is cut at different angles by a family of straight lines. The number of black contrast points on the individual lines and the number of intersection points of the lines with the character or mark being scanned are analyzed and compared by a computer against memorized reference characters.

These known techniques depend heavily on standardized fonts, or approximations thereof, for recognizing the characters or marks.

SUMMARY OF THE INVENTION

It is an object of the invention to provide a method for the optical recognition of alphanumeric characters and other marks that has an improved recognition capability which approximates the human ability to more abstractly recognize similarities.

The invention starts with a method often referred to as advanced shape recognition (ASR). This method is used, for example, in automation equipment for the position-independent recognition of parts. In this method, the outer contour of a part is scanned and at first approximated by a polygon shape. The polygon shape is then transformed into the tangent space; i.e. it is converted into a curve which is defined by the length and the angle of the consecutive line segments of the polygon. The resulting curve of the scanned part is compared against memorized reference curves that represent the outer contours of the parts being distinguished. This known method has the advantage that the comparison can be independent of position because the curve is invariant to rotation in the tangent space. A rotation of the part and its outer contour corresponds to a linear displacement of the curve in the tangent space. By displacing the scanned and reference curves with respect to each other, they can be overlapped so that they can be compared.

The known ASR method is modified and further developed by the present invention for recognizing alphanumeric characters. For this, the reference curves stored in the database, which correspond to reference characters, and likewise the curves resulting from scanning the characters to be recognized, are normalized in the tangent space. This normalization means that the polygon shapes of the reference curves and the character curves are given a common length. This normalization of the curves in the tangent space corresponds to a linear magnification or miniaturization of the polygon shape and, thus, the contour of the character to be recognized. Due to this normalization, the character recognition becomes independent of the font size of the characters to be recognized.

Furthermore, according to the invention, both the outer and inner contours of the alphanumeric characters are evaluated. The outer and inner contours of the reference characters are kept in the database as a set of reference curves in the tangent space. Accordingly, the outer contour and the inner contours of the character to be recognized are detected and transformed into corresponding character curves in the tangent space. The number and shape of the inner contours as well as their geometrical position coordination to the outer contour represent important additional features of the alphanumeric characters, which facilitates the character recognition. There are characters which have only an outer contour and no inner contour, such as the letter "1" or the number "2". Moreover, there are characters with only one inner contour, such as the letter "P" or the number "9". Finally, there are characters with two inner contours, such as the letter "B" or the number "8". Thus, a set of reference curves of a reference comprises a reference curve of the outer contour and two reference curves of the inner contours, where none, one, or both reference curves of the inner contours form a polygon shape.

If a character has one or two inner contours, then the curves of the outer contour and the inner contours are rotation-invariant and correspond to the given fixed geometrical relationship between the inner contours and the outer contour of the character. When comparing the curves, it is therefore sufficient to shift the character curve of the outer contour and the reference curve of the outer contour relative to each other in order to test for character similarity. If the normalized curves of the outer contour are made to coincide by linear displacement in the tangent space, i.e. rotation of the polygon shapes, the curves of the inner contours will also necessarily coincide. This simplifies the computation processes for the comparison operation.

As a rule, therefore, only the curves of the outer contours are used to make the character curve coincide with the reference curves. For similarity comparisons, i.e. for determining differences between the character curves and the reference curves, the curves of the outer contours and the curves of any inner contours that may be present are used. In this manner, the present invention provides an improved higher character recognition capability.

It is of course also possible to use the curves of the inner contours, in addition to the curves of the outer contour, to make the character curves coincide with the reference curves for similarity comparisons. This improves the character recognition, especially if the character has printing defects. But since this method entails greater computing expense, the shifting of the curves of the outer contour is generally considered sufficient to make the curves coincide for comparing their similarities.

To make the character recognition more independent of inaccuracies in the way the character is shown or printed and/or of slight distortions and deformations of the character, the approximated polygon shapes of the scanned character to be recognized are preferably simplified by an equalization process. This equalization procedure corresponds to a certain abstraction of the character shape and considerably reduces the amount of data that must be processed.

A further simplification is achieved by assembling certain polygon segments, i.e. several consecutive straight line elements of the polygon shape, into a polygon curve for the character which is used for the similarity comparison. This reduces the amount of data that must be processed and computing expenses.

A major benefit of the method of the present invention is that the character recognition and the comparison against the reference characters are invariant to rotation and scaling; i.e. it is independent of the position and orientation of the character to be recognized as well as of its size.

Moreover, the character comparison becomes less dependent on distortions and deformations of the character representation and disturbances and inaccuracies in the character printing. The comparison of an outer contour and inner contours improves the recognition capability for alphanumeric characters. The tangent curve as a characteristic of the character shape comes closest to the human abstraction ability when recognizing shapes, which means less dependency on the font shape. The method can therefore be used in more ways and more reliably recognizes characters than was the case in the past.

BRIEF DESCRIPTION OF THE DRAWINGS

FIGS. 1a, b illustrate the transformation of a two-dimensional polygon into the tangent space, FIGS. 2a, b illustrate the principle of step equalization.

DESCRIPTION OF THE PREFERRED EMBODIMENTS

Figure 3A:
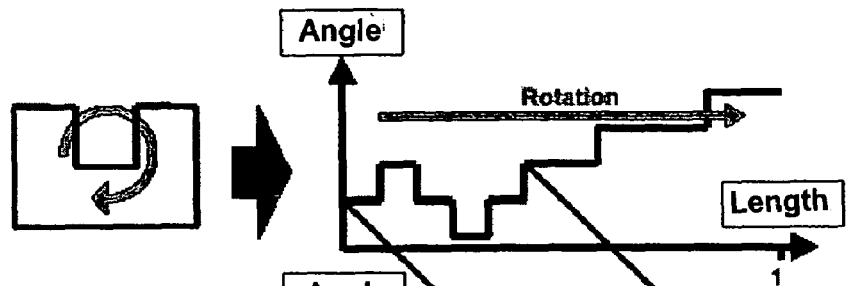
FIGS. 3a-c illustrate the shape comparison of a character to be recognized with a reference character.

The goal of the invention is to automatically optically detect and recognize marks such as alphanumeric characters, particularly letters and numbers. The characters to be recognized can have any spatial arrangement, as is the case, for example, when inscriptions on objects occurring in no particular order need to be identified.

For this, it is first necessary to detect the characters to be identified. A scanner is aimed at the characters to be determined and focused. The complete picture of the characters to be identified is then recorded by a camera, line by line or in two-dimensional matrix form, and transformed into a binary data record for computer processing.

After this, the total picture of the characters to be identified is segmented; i.e. the individual alphanumeric characters contained in the total picture must be distinguished from each other and identified as single characters.

The algorithm described hereafter is used to recognize alphanumeric characters that have been digitized and segmented in this manner.

The outer contour and the one or two inner contours which may be present in the character to be recognized are initially approximated by a closed polygon. The polygon shapes of the outer contour and the inner contours are then transformed into the tangent space, as is illustrated in FIG. 1a with the example of a polygon resembling a human figure. The polygon shape represented in FIG. 1a in the X-Y plane is then broken down into its individual straight line elements. The successive straight line segments occurring in the clockwise direction are numbered, starting for example with 0 in the right arm pit, and are characterized each time by the length of the line segment and its angle relative to the preceding line segment. In the tangent space shown in FIG. 1b, the consecutive line segments are arranged such that their length is plotted as the abscissa and the angle relative to the preceding line segment as the ordinate. Since this relates to a closed polygon shape, an overall angle of 360° is obtained, which appears as a jump between the starting line and the ending line in the tangent space.

Thus, the character curve in the tangent space resulting from this transformation represents an unambiguous mapping of the shape of the polygon in the two-dimensional plane of FIG. 1a.

To enable a size-independent, i.e. scale-invariant, comparison with reference characters, the overall length of the polygon shape, i.e. the length of the character curve in the tangent space, is normalized to 1. This corresponds to a proportional enlargement or reduction of the contours of the scanned character to be identified to a normalized unit size.

The characters or marks to be recognized usually have defects, irregularities and/or mistakes in their outer contour and/or their inner contours that were generated during printing or affixing the characters to carrier surfaces. These defects and inaccuracies form line elements and corner points in the approximated polygon shape that involve only relatively slight deviations from the adjoining line elements. To reduce the influence of such defects and inaccuracies, which impede the character recognition, the following described stepwise equalization is preferably performed. This results in somewhat of an abstraction, i.e. a simplification of the contours of the scanned character and, thus, a simplification of the character curves in the tangent space.

For such a stepwise equalization, an algorithm is used which evaluates a so-called "visual relevancy" of the corner points of the polygon shape. This simplification, also referred to as "evolution", is explained with reference to FIGS. 2a and 2b.

A polygon segment with line segments o, p, q, r, shown in FIG. 2a, has a corner point formed by the line segments p and q. FIG. 2b shows the curve of this polygon shape transformed into the tangent space.

To determine the significance of the corner point formed by line segments p and q to the visual identification of the character, line segments p and q are replaced by a line segment s. The angle "y" between the line segment o and the line segment s is determined so that an equally large surface F is formed in the tangent space between the line segment p and the line segment s, and between the line segment q and the line segment s, as is shown in FIG. 2b. The surface F, in the normalized tangent space, is:

$$F = \frac{[(\alpha - \beta)] * p * q}{p + q}$$

As is apparent from this formula, a large value for F, i.e. a high visual relevancy, can result from both a large change of the angle at the corner point and/or long line segments at the corner point.

To simplify the polygon shape, the corner point of the polygon shape with the lowest visual relevancy is first determined and removed in the above-described manner and replaced with a line segment. This necessarily changes the visual relevancy of the corner points neighboring the removed corner point. Their visual relevancy must now be calculated anew. These steps are repeated for all corner points until only those corner points remain whose visual relevancy F lies above a particular threshold value. This threshold value is selected on the basis of two conditions. First, the shape of the character being recognized should be simplified as much as possible; i.e. the data quantity present for the subsequent shape comparison should be reduced to the greatest extent possible, to keep computing requirements down. Second, the simplification should not impair the unambiguous recognizability of the contours. A balanced threshold value meeting these requirements is the range of about $0.3 < F < 0.5$.

The character curves in the tangent space of the detected character that is to be recognized, simplified as necessary by the above-described step equalization, are then compared to normalized reference curves, which are stored in a data bank or memory as a mapping of reference characters. The comparison is explained with reference to FIGS. 3a-c.

FIG. 3a shows the outer contour of a character to be recognized, detected in the above-described manner, and its character curve transformed into the tangent space.

Figure 3B:
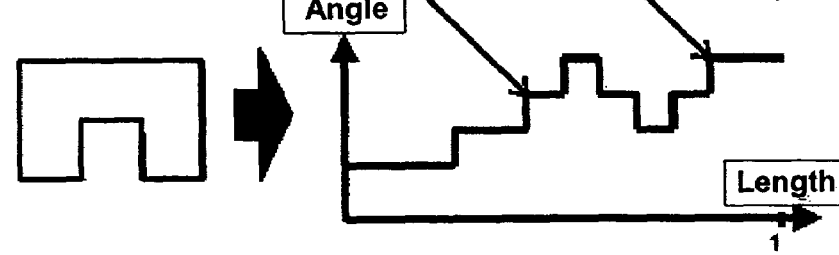

FIG. 3b shows the corresponding reference character and its normalized reference curve stored in the database.

Figure 3C:
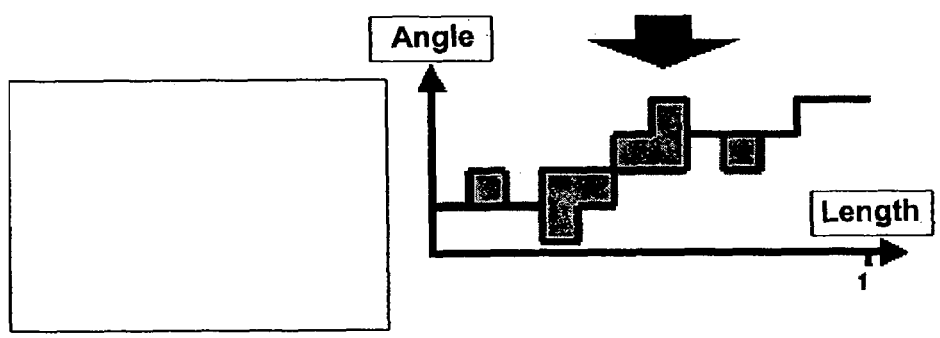

In the illustrated sample embodiment, the outer contour of the character to be recognized and the outer contour of the reference character coincide. Accordingly, the character curve of the character to be recognized and the reference curve are also congruent in the tangent space. However, because of the random arrangement of the character to be recognized during its optical detection, its orientation is rotated relative to that of the reference character. This different positional orientation of the character to be recognized and the reference character corresponds to a displacement of character curve and reference curve in the tangent space, as is apparent when comparing FIGS. 3a and 3b. The detected character curve and the particular reference curves stored in the database are now placed on top of each other by the computer for a shape comparison, as is shown in FIG. 3c. The surface of the areas enclosed between the character curve and the particular reference curve is a measure of the similarity of the two curves. In FIG. 3c, there is a relatively large surface area formed between the character curve and the reference curve, which means that there is a relatively small degree of similarity. The character curve and the reference curve are now shifted relative to each other in the tangent space by the computer until the surface enclosed between these curves is at a minimum. This shifting of the curves in the tangent space corresponds to a rotation of the character contours, which is represented in FIG. 3a by arrows.

The thus determined minimum of the surface area between the character curve of the scanned character to be recognized and the particular reference curve is used as a measure of the difference of the character to be recognized from the particular reference character it is compared with. The reference character for which this difference is smallest, i.e. which results in a minimum surface area between character curve and reference curve, is then chosen as the recognized character.

A further embodiment of the invention is explained with reference to FIG. 4.

Figure 4:
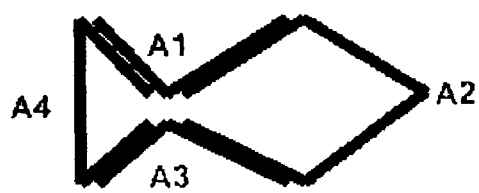
FIG. 4 illustrates the transformation of a polygon into curves.

FIG. 4 shows how the polygon shape that represents the contour of the character is broken down into individual polygon curves. The straight line segments of the polygon shape are assembled into a polygon curve in which each line segment has an angle in the same direction of rotation relative to the preceding line segment. The polygon shape is thereby changed into polygon curves that in succession are alternately concave and convex. FIG. 4 shows, for example, a concave polygon curve A1; i.e. as the polygon is followed in clockwise direction, the angle of the line segments varies counterclockwise. The next polygon curve A2 is outwardly convex; i.e. the angle between the consecutive line segments varies clockwise. The polygon curve A3 is once again concave and the polygon curve A4 is again convex.

During the comparison of the curve shapes in the tangent space, the individual polygon curves of the scanned character to be recognized are compared with the polygon curves of the reference characters stored in the database. As can be seen from FIG. 4, at the transition between the concave and convex curve segments, each line segment is valued twice, once as the end line segment of the preceding polygon curve and again as the starting line segment of the next polygon curve.

The shape comparison recognizes, as the correct character, that reference character for which the sum of the deviations of the individual polygon curves that were compared to each other is the smallest.

Evaluating the character similarity with the consecutively concave and convex polygon curves results in a better approximation of the shape comparison to the human abstraction ability and shape conceptualization. One can even recognize correctly and with higher selectivity characters which are significantly shifted or distorted with respect to the reference characters, as long as they coincide sufficiently well with the reference character in the sequence of convex and concave curve segments. Displacements and angle rotations of individual curve segments relative to each other have less influence on the character recognition because the shape recognitions of the individual curve segments are more or less disconnected from each other due to the double evaluation of the overlapping end and beginning of the line segments.

According to the invention, the characters are defined by three contours. An outer contour is present for each alphanumeric character. Characters differ in the number of inner contours. There are characters having no inner contour, other characters have only one inner contour, and some characters have two inner contours. Each time, three contours are saved in the database for the reference characters: one reference curve for the outer contour and two reference curves for the inner contours. For the characters having none or only one inner contour, a continuous horizontal line occurs for the absent inner contours.

For the character to be recognized, the outer contour and the inner contours, if present, are determined each time. During the shape comparison of the character curves and the reference curves in the tangent space, the outer contours and also the inner contours are compared. An optimal similarity results when the overall deviations for the outer contour and the inner contours are at a minimum. If a character to be recognized has a number of inner contours that differ in comparison to a reference character, a large deviation results during the comparison due to the absent inner contour for one of the characters, even if the outer contours of the characters do not differ by much.

Figure 5:
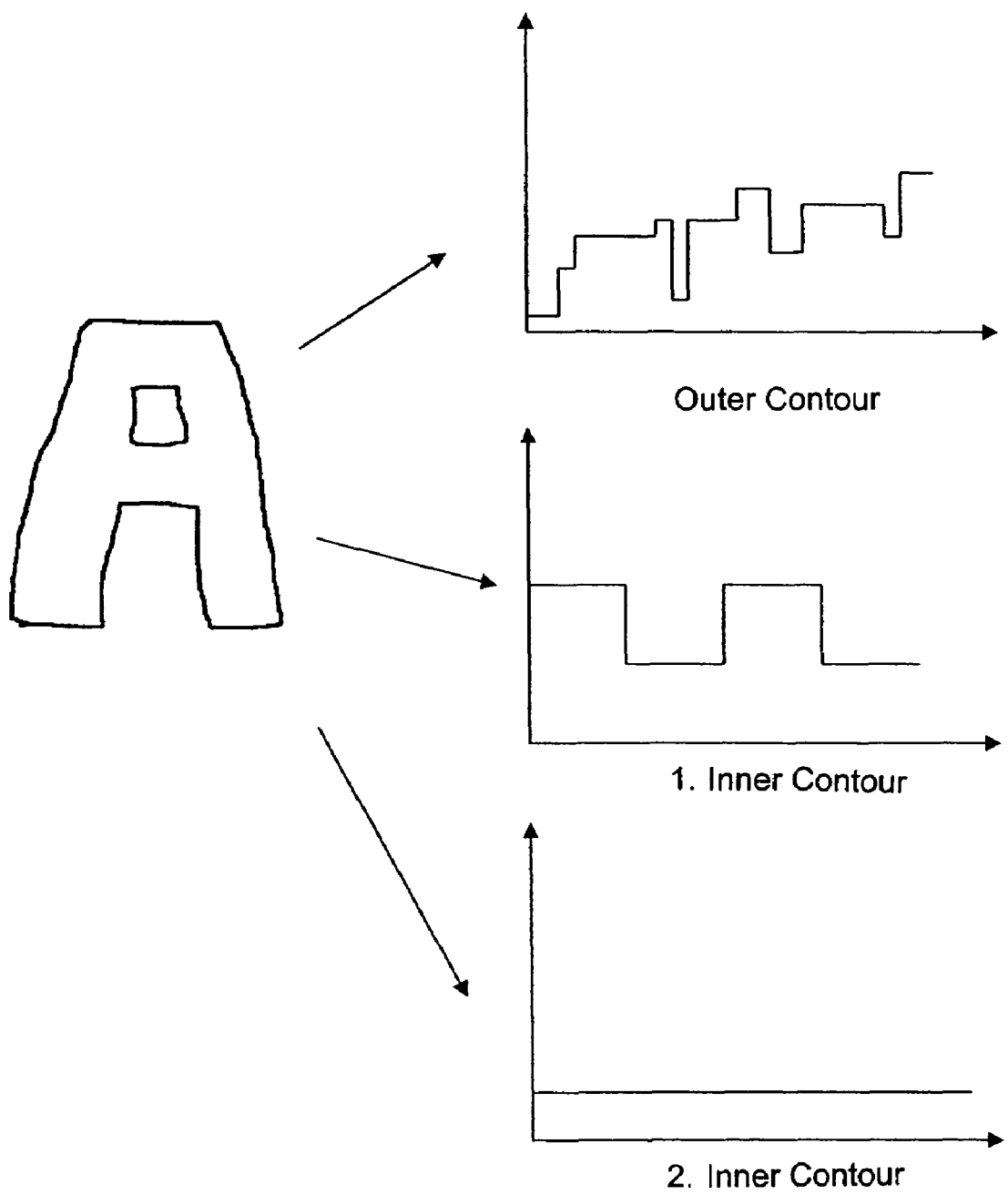
FIG. 5 illustrates the transformation of an alphanumeric character with outer contour and inner contour into the tangent space.

FIG. 5 shows the transformation of the letter "A" into three character curves in the tangent space. Since the letter "A" has only one inner contour, a "null curve" results for the second inner contour for the shape comparison with the reference curves.

Since the inner contour of the alphanumeric character has a fixed geometrical position in relation to the outer contour, when the shape of the character to be recognized is compared to the reference characters, it is initially only necessary to make the outer contours of the compared characters overlap each other in the manner described with reference to FIG. 3, i.e. to make the character curve of the outer contour coincide with the reference curve for the outer contour. During rotation of the characters or shifting of the curves in the tangent space, the inner contours are necessarily made to coincide in the same way. A determination of the deviations is then done for all three curves, provided the outer contours have been made to overlap. Of course, it is also possible to use both the outer contour and the inner contours to make the character curves and the reference curves overlap during the rotation of the characters as is illustrated in FIG. 3. This can produce a higher accuracy of the character recognition, but also entails a greater data processing effort.

The invention claimed is:

1. A method for optically recognizing alphanumeric characters comprising:
   a) storing polygonal outer contours and inner contours of reference characters and their relative geometrical positions as normalized reference curves transformed into a tangent space;
   b) optically scanning an outer contour and inner contours of a character to be recognized and transforming scanned data into binary data;
   c) approximating the outer contour and the inner contours of the character to be recognized as a polygon, normalizing straight line segments of the polygon and transforming the normalized straight line segments into a tangent space to generate character curves;
   d) comparing the character to be recognized to the reference characters in a rotation-invariant manner by shifting at least the character curve of the outer curve and the reference curves of the outer contours relative to each other in the tangent space until a surface area enclosed by the character curve and a given reference curve is at a minimum;
   e) using the surface area between the character curves for the outer contour and the inner contours of the character to be recognized and respective reference curves for outer contours and the inner contours of the reference characters as a measure of the extent to which the character and the reference characters differ; and
   f) selecting the reference character which yields the smallest surface area between the character curves and the reference curves as the recognized character.

2. A method according to claim 1 wherein the reference character and the character to be recognized are defined by an outer contour and two inner contours, which are compared for recognizing the character, and substituting a straight line in the tangent space for an inner contour which is absent from the characters.

3. A method according to claim 1 including employing differences between the outer contours and the inner contours of the character to be recognized and the reference character to rotationally invariantly overlap the character curves and the reference curves.

4. A method according to claim 1 including eliminating corner points of the polygon having little visual relevancy by stepwise equalizing the contours of the character to be recognized when approximating the polygon.

5. A method according to claim 1 including converting the polygon of the contours of the reference character and of the character to be recognized into alternating concave and convex polygon curves, separately comparing alternating polygon curves, and using a sum of surface areas enclosed between the curves of the character to be recognized and a given reference character as a measure of the difference between the character to be recognized and the given reference character.

* * * * *